United States Patent [19]
Eaton

[11] Patent Number: 5,311,710
[45] Date of Patent: May 17, 1994

[54] PORTABLE CURING CELL

[76] Inventor: Jay S. Eaton, Rte. 2, Buladean, Bakersville, N.C. 28705

[21] Appl. No.: 850,410

[22] Filed: Mar. 11, 1992

[51] Int. Cl.$^5$ .......................... E04H 6/00; A47F 5/08
[52] U.S. Cl. ........................ 52/174; 52/90.1; 52/86; 52/165; 211/113; 34/240; 34/217
[58] Field of Search ............... 52/86, 90.1, 90.2, 93.1, 52/93.2, 92.1, 174, 165, 101, 721, 741.1, 158; 211/191, 113, 115; 34/218, 217, 240, 241, 239, 201; D25/126, 42, 38, 29, 17, 14

[56] References Cited

U.S. PATENT DOCUMENTS

| | | | |
|---|---|---|---|
| 58,308 | 9/1866 | Shankland | 52/158 |
| 333,985 | 1/1886 | Wilson . | |
| 715,185 | 12/1902 | Warner . | |
| 1,712,650 | 5/1929 | Clark . | |
| 1,924,986 | 8/1933 | Frazier | 52/721 |
| 2,777,446 | 1/1957 | Bogaty . | |
| 2,832,362 | 4/1958 | Critoph . | |
| 2,904,193 | 9/1959 | Poythress . | |
| 2,988,810 | 6/1961 | Wilken . | |
| 3,279,133 | 10/1966 | De Korte . | |
| 3,330,080 | 2/1967 | Grieb et al. . | |
| 3,443,311 | 9/1967 | Wright | 52/174 |
| 3,580,386 | 5/1971 | Arnould . | |
| 3,724,145 | 4/1973 | Daniel | 52/165 |
| 3,777,425 | 12/1973 | Le Bourgeois . | |
| 3,831,769 | 8/1974 | Frank | 211/113 |
| 3,999,303 | 12/1976 | Martin et al. . | |
| 4,038,929 | 8/1977 | Sain | 211/113 |
| 4,064,648 | 12/1977 | Cary . | |
| 4,068,405 | 1/1978 | Campbell et al. . | |
| 4,124,123 | 11/1978 | Armington et al. | 52/174 |
| 4,258,514 | 3/1981 | St. Clair . | |
| 4,528,787 | 7/1985 | Rittinge | 52/101 |
| 4,649,678 | 3/1987 | Lamson . | |
| 4,663,860 | 5/1987 | Beall | 34/217 |
| 4,664,131 | 5/1987 | Moorefield, II . | |
| 4,676,032 | 6/1987 | Jutras . | |
| 4,790,334 | 12/1988 | Day et al. | 34/240 |
| 5,157,882 | 10/1992 | Soble | 52/165 |

OTHER PUBLICATIONS

Advertisement: Dixie Greenhouse Manufacturing Co.

Primary Examiner—Carl D. Friedman
Assistant Examiner—Winnie Yip
Attorney, Agent, or Firm—Dority & Manning

[57] ABSTRACT

A portable curing cell assembly is provided for storing tobacco for curing, the curing cell assembly may comprise a kit of component parts capable of being easily assembled and disassembled in the field. The curing cell assembly includes a frame structure which defines at least one storage bay through which an elevating trailer can be transported. Tobacco rod holding members are provided disposed longitudinally along the side of the storage bay so that tobacco laden tobacco rods can be suspended from the holding members across the storage bay. A roof is disposed across and above the storage bay, the roof being supported generally by the frame structure as a predetermined height above the tobacco rod holding members. Tobacco rod maintaining members are provided in place along the top of the tobacco rod holding members so that the tobacco rods extending across the storage bays are generally parallel relative each other and maintained in that position for subsequent retransfer to the elevating trailer once the tobacco has cured. Guiding and aligning rails are provided to positively guiding the elevating trailer through the storage bays.

19 Claims, 5 Drawing Sheets

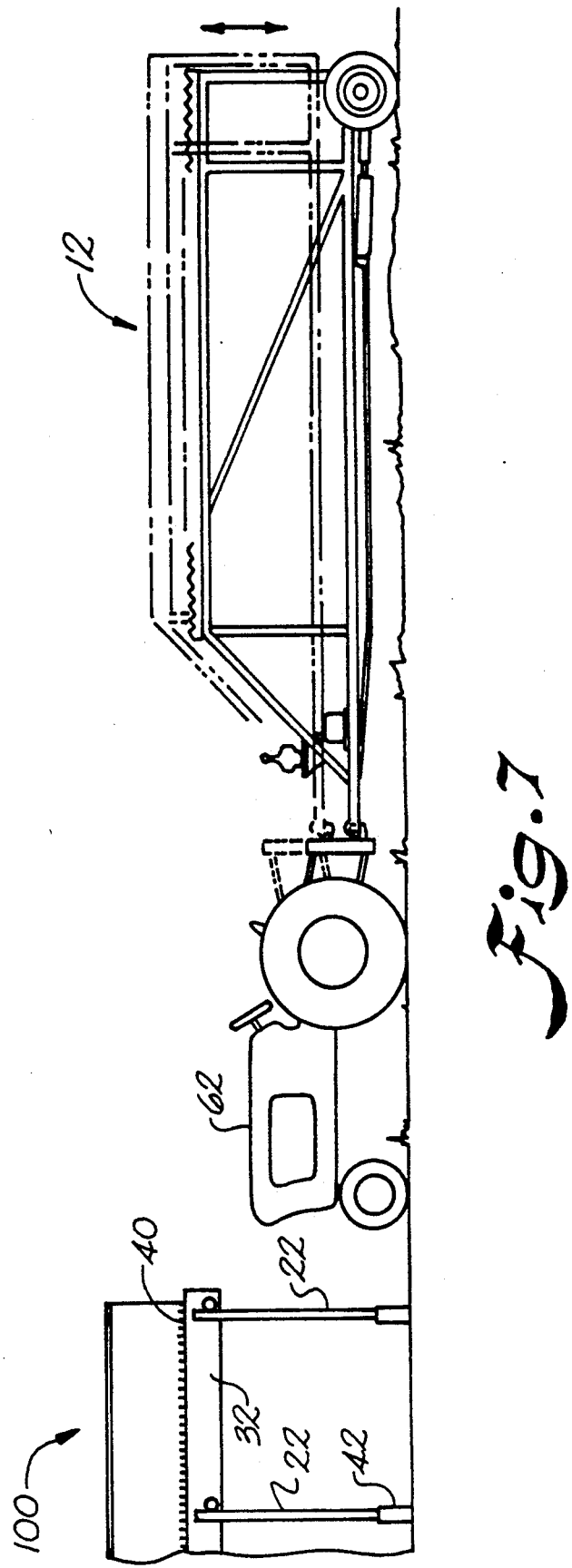

PORTABLE CURING CELL

BACKGROUND OF THE INVENTION

The present invention relates to a curing cell for storing burley tobacco for curing and more particularly to an apparatus and method for assembling a portable curing cell assembly having holding means for storing a plurality of tobacco laden tobacco rods.

Burley tobacco plants grow as relatively tall stalks with the tobacco leaves growing radially out from the stalks. Typically, when the burley tobacco stalks are cut down, the widest portion (bottom of the stalk) of the main stem is manually skewered onto a stake or rod which has a sharpened point affixed or attached at one end thereto. Generally, the rods are about five or six feet long, and about five or six different stalks are threaded onto each stake. After the threading process, the stakes would then be transported to wooden curing sheds for curing the tobacco.

The tobacco rods or stakes were usually suspended in levels or tiers within the curing sheds, generally three or four tiers of tobacco stakes would be hung within any single curing shed. The stakes were fairly tightly packed within the curing shed and this condition necessitated a relatively long time for curing the tobacco.

The tobacco stakes were either carried to the curing sheds by workers or loaded onto trailers and driven to the curing sheds. Once at the sheds, the stakes were manually transferred to the supports within the curing shed. Mechanical means, such as the tobacco stick elevator disclosed by Arnold U.S. Pat. No. 3,580,386, may have been used to raise the tobacco sticks to their appropriate tiers within the curing shed where they would then be manually transferred to racks within the curing shed.

In general, the conventional process of harvesting burley tobacco and hanging it in curing sheds is a fairly labor intensive operation requiring a number of workers and a permanent curing shed structure. Also, the further the tobacco field is located from the curing shed, the more equipment, time, and manpower is expended in preparing the tobacco for curing.

References related to roofed structures in general which may be of interest to the present invention include U.S. Pat. No. 3,330,080 to Grieb et al., U.S. Pat. No. 2,988,810 to Wilken, U.S. Pat. No. 2,832,362 to Critoph, U.S. Pat. No. 4,676,032 to Jutras, U.S. Pat. No. 715,185 to Warner, and U.S. Pat. No. 3,777,425 to Le Bourgeois. U.S. Pat. No. 4,258,154 to St. Clair discloses a method and means for anchoring a dismountable building by means of earth penetrating members. U.S. Pat. No. 4,649,678 to Lamson, and U.S. Pat. No. 3,279,133 to De Korte pertain to boundary markers in general.

OBJECTS AND SUMMARY OF THE INVENTION

It is a principle object of the present invention to provide a portable curing cell assembly which can be easily assembled in the field in a relatively short period of time.

A further object of the present invention is to provide a curing cell for curing burley tobacco whereby a single operator can load and unload tobacco laden tobacco rods from an elevating trailer.

Still another object of this invention is to provide a curing cell with a plurality of storage bays for storing tobacco rods whereby there is a desirable amount of space between the tobacco rods resulting in an enhanced curing process.

Yet a further object of the present invention is to provide a portable curing cell through which a work vehicle can transport an elevating trailer carrying a plurality of tobacco rods whereby the elevating trailer can deposit the tobacco rods in the curing cell in a single operation.

It is also an object of the present invention to provide a portable curing cell which can be easily disassembled and stored in relatively small area.

Yet another object of the present invention is to provide a tobacco curing cell kit having component parts capable of being assembled and disassembled in the field for forming a portable tobacco curing cell.

Yet another purpose of this invention is to provide curing cell kit that can be readily assembled by relatively unskilled laborers in a relatively short time.

A further object of this invention is to provide a method for erecting a portable tobacco curing cell.

Still another object of this invention is to provide an apparatus and method for erecting a portable tobacco curing cell utilizing a template assembly for properly positioning and aligning the frame structure of the curing cell.

And still another object of the present invention is to provide apparatus and method for efficiently curing tobacco in a timely and space conservative manner.

Additional objects and advantages of the invention will be set forth in part in the description which follows, and in part will be obvious from the description or may be learned by practice of the invention. The objects and advantages of the invention may be realized and obtained by means of the instrumentalities and combinations particularly pointed out in the appended claims. To achieve the objects and in accordance with the purpose of the invention, as embodied and broadly described herein, a portable curing cell assembly for storing tobacco for curing is provided, the tobacco having been cut and impaled on tobacco rods which have been loaded onto an elevating trailer for transferring to the curing cell assembly. The curing cell assembly comprises a frame structure, the frame structure defining at least one longitudinally disposed storage bay, the storage bay having a width sufficient for allowing the elevating trailer to be transported therethrough; means for holding tobacco rods, the tobacco rod holding means being disposed longitudinally along each side of the storage bay so that tobacco laden tobacco rods can be suspended from the tobacco rod holding means across the bay, the tobacco rod holding means being supported by the frame structure at a predetermined height thereon so that the suspended tobacco stalks have a predetermined degree of ground clearance; a roof disposed across and above the storage bay, the roof being supported by the frame structure at a predetermined height above the tobacco rod holding means; means for maintaining tobacco rods in place along the tobacco rod holding means so that the tobacco rods extending across said storage bay are generally parallel relative each other; and means for guiding and aligning the elevating trailer through the storage bays.

In one preferred embodiment of the present invention, the frame structure defines a plurality of the storage bays disposed adjacent each other. The frame structure may define the storage bays by spaced apart rows of vertical support poles, the space between the support poles being the storage bays. Preferably, the vertical support poles may be arranged in transverse pairs within the rows to provide enhanced structural support.

In another preferred embodiment of the invention, the guiding and aligning means includes at least one guide support rail secured to the vertical support poles in one of the rows generally near the bottom of the support poles, the guide support rail facing the storage and longitudinally disposed relative the storage bay and secured to the support poles generally at a height equivalent to that of the wheels of a work vehicle used for transporting the elevating trailer into and out of the storage bay. In an alternative embodiment, the guide support rails are longitudinally positioned on the ground or floor of the storage bay and not attached to the frame structure.

And in still another embodiment of the invention, the frame structure further includes a plurality of horizontal braces secured across the vertical support poles generally near the top thereof and disposed generally transversely relative to the storage bay. The tobacco rod holding means may preferably comprise at least two longitudinally disposed rigid elongated carrying members secured to the horizontal braces.

The tobacco rod maintaining means may comprise alternating recesses disposed along the length of the carrying members, for example, a plurality of protuberances disposed at pre-measured distances from each other along the top of the carrying members. In another embodiment, the carrying members may comprise a relatively flat top with the maintaining means constituting the frictional interface between the tobacco rods and the carrying members.

The vertical support poles are preferably fitted into tubular sockets which have been driven into the ground through a template. The template provides a relative easy and full proof method for properly establishing and aligning the rows of vertical support tubes.

To further achieve the objects and in accordance with the purpose of the invention, as embodied and broadly described herein, a tobacco curing cell kit having component parts capable of being assembled and disassembled in the field for forming a portable tobacco curing cell is provided. The kit comprises the combination of a frame structure adapted to be assembled in the field, the frame structure including a plurality of interchangeable vertical support poles, a plurality of interchangeable tubular sockets, a plurality of interchangeable horizontal braces, and a plurality of interchangeable fasteners, the tubular sockets adapted to be driven into the ground in a predetermined pattern of spaced apart longitudinally disposed rows whereby the vertical support poles may be fitted into the tubular sockets to form spaced apart rows of vertical support poles and whereby the horizontal braces may be mounted generally perpendicularly to the vertical support poles generally near the top thereof with the fasteners, whereby when assembled the frame assembly defines at least one longitudinally disposed storage bay between at least two rows of vertical support poles; rigid elongated tobacco rod carrying members adapted to be secured to the horizontal braces and disposed lengthwise and oppositely faced relative the storage bay, the tobacco rod carrying members comprising tobacco rod maintaining means disposed across the top thereof; a roof adapted to be secured to the frame structure, the roof comprising a plurality of roofing braces adapted to be secured to the outermost of the vertical support poles whereby the roofing braces extend across and over the storage bays, the roof including sheeting material adapted to be fitted upon the roofing braces; and elongated guide support rails adapted to be disposed longitudinally within said storage bay and configured to guide and align a work vehicle with attached elevating trailer through said storage bay.

In another preferred embodiment of the present invention, the curing cell kit further includes a template which has tubular openings disposed therethrough through which the tubular sockets can be driven. The tubular openings are disposed in the template in a predetermined pattern so that the tubular sockets driven therethrough form the spaced apart longitudinally disposed rows. An additional template may also be included whereby the templates are connectable and have an exact predetermined space therebetween when connected so that at least two rows of the tubular sockets can be positioned through the templates with an exact space therebetween.

To further achieve the objects and in accordance with the purposes of the invention, a method is provided for erecting a portable tobacco curing cell, the curing cell defining at least one storage bay for suspending a plurality of tobacco laden tobacco rods thereacross for curing. The method comprises the steps of laying a template assembly upon the ground at a preselected site, the template assembly having a predetermined pattern of tubular openings disposed therein; driving tubular sockets through the tubular openings so as to form longitudinally disposed spaced apart rows of tubular sockets; lifting the template assembly from the tubular sockets and repositioning the template assembly so that additional tubular sockets can driven therethrough and be aligned with the other tubular sockets so as to lengthen the spaced apart rows of tubular sockets; fitting vertical support poles into the tubular sockets; securing horizontal braces generally perpendicularly to the vertical support poles and generally near the top of the poles; securing a rigid tobacco carrying member to the horizontal braces of each row of vertical support tubes with fastening means, the rigid tobacco rod carrying member having tobacco rod positioning means disposed along the top thereof; securing roofing braces to the outermost rows of vertical support poles so that the roofing braces extend above and across all of the rows of vertical support poles; and fitting roofing sheeting material over the roofing braces.

The accompanying drawings, which are incorporated and constitute a part of the specification, illustrate one embodiment of the invention, and together with the description serve to explain the principles of the invention.

BRIEF DESCRIPTION OF THE DRAWINGS

A full and enabling disclosure of the present invention, including the best mode thereof, directed to one of ordinary skill in the art is set forth in the remainder of the specification, which makes reference to the appended figures in which:

FIG. 1 depicts tobacco laden tobacco rods extending across two storage bays in accordance with the invention.

FIG. 2 also depicts various embodiments of the tobacco rod holding means and positioning/maintaining means according to the present invention.

In FIG. 6, the right hand vertical support pole defines the left boundary of one storage bay, while the left hand vertical support pole defines the right boundary of a second storage bay.

FIG. 7 is a perspective illustration of the curing cell assembly according to the present invention showing a work vehicle and elevating trailer in relation with the curing cell assembly.

Figure 1:
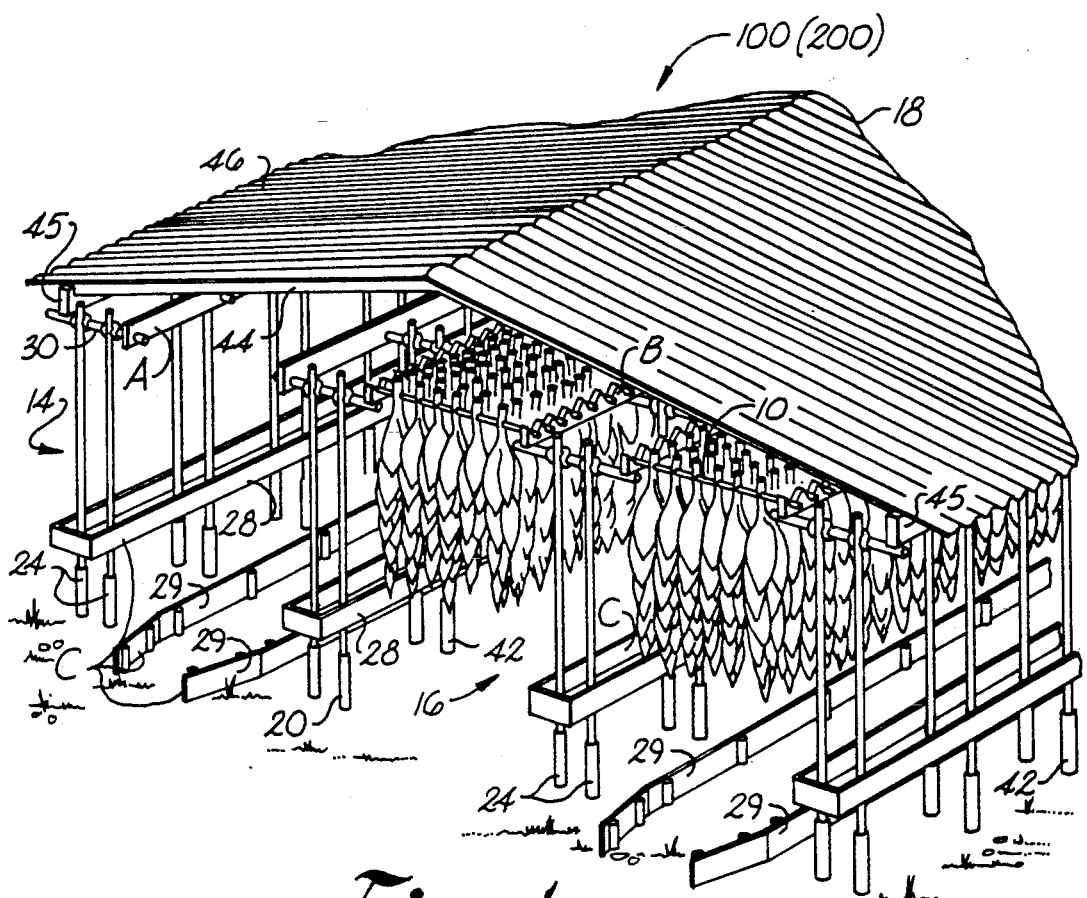
FIG. 1 is a perspective illustration of the curing cell assembly, or assembled kit, according to the present invention.

Repeat use of reference characters in the following specification and appended drawings is intended to represent the same or analogous features, elements, or steps of the present invention.

BRIEF DESCRIPTION OF THE PREFERRED EMBODIMENTS

Reference will now be made in detail to the presently preferred embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalent.

Referring to FIG. 1, portable curing cell assembly 100 is provided for storing tobacco for curing, the tobacco having been cut and impaled on tobacco rods 10 which have been loaded onto an elevating trailer 12 (FIG. 7) for transferring to curing cell assembly 100. Curing cell assembly 100 comprises frame structure 14 which defines at least one longitudinally disposed storage bay 16 having a width sufficient for allowing elevating trailer 12 to be transported therethrough. Means A for holding tobacco rods is also provided disposed longitudinally along each side of storage bay 16 so that tobacco laden tobacco rods 10 can be suspended from holding means A across bay 16, holding means A being supported by frame structure 14 at a predetermined height thereon so that the suspended tobacco stalks have a predetermined degree of ground clearance. Assembly 100 further includes roof 18 disposed across and above storage bay 16, roof 18 being supported by frame structure 14 at a predetermined height above holding means A. Assembly 100 further comprises means B for maintaining tobacco rods in place along holding means A so that tobacco rods 10 extending across storage bay 16 are generally parallel relative each other. Means C are include for positively guiding and aligning the elevating trailer through the storage bays.

As shown in FIG. 1, in a preferred embodiment of assembly 100 a plurality of storage bays 16 are provided disposed adjacent each other. In a most preferred embodiment, three bays 16 are provided but any number of storage bays 16 may be defined by frame structure 14.

Curing cell assembly 100 is portable in that it may be easily constructed from a kit on a pre-selected site. Once the tobacco has been properly cured, assembly 100 may then be disassembled, or left standing, whichever is preferred.

Frame structure 14 may include rows 20 of vertical support poles 22. Rows 20 are spaced apart a predetermined distance thereby defining storage bays 16 between rows 20. Vertical support poles 22 may be disposed singularly within rows 20 or, preferably disposed as pairs 24 as illustrated in FIG. 1. In other words, a single row 20 may comprise a series of pairs 24 of vertical support poles 22. It is preferred to use pairs 24 of the poles 22 to provide enhanced structural support and ease of construction of assembly 100. However, it should be understood that a single support pole 22 may suffice, or more than two poles may be arranged in any desired pattern to form rows 20. For example, row 20 may comprise an alternating series of singular poles 22 and paired poles 24.

Generally, when more than a single file of poles 22 are used to form row 20, the poles 22 are disposed adjacent each other and transverse to the longitudinal line of row 20 or storage bay 16.

Guiding and aligning means C may further comprise at least one guide support rail 28 secured to frame structure 14 and disposed longitudinally relative storage bay 16 at a height generally equivalent to that of the wheels of work vehicle 62 (FIG. 7) used for transporting elevating trailer 12 into and out of storage bay 16. Guide support rail 28 may be attached to the vertical support poles 22 within a row 20, as shown in FIG. 1. In this embodiment, guide support rail 28 is attached to support poles 22 so that it faces inward towards storage bay 16. Any appropriate means may be utilized to attach guide rail 28 to poles 22.

Figure 6:
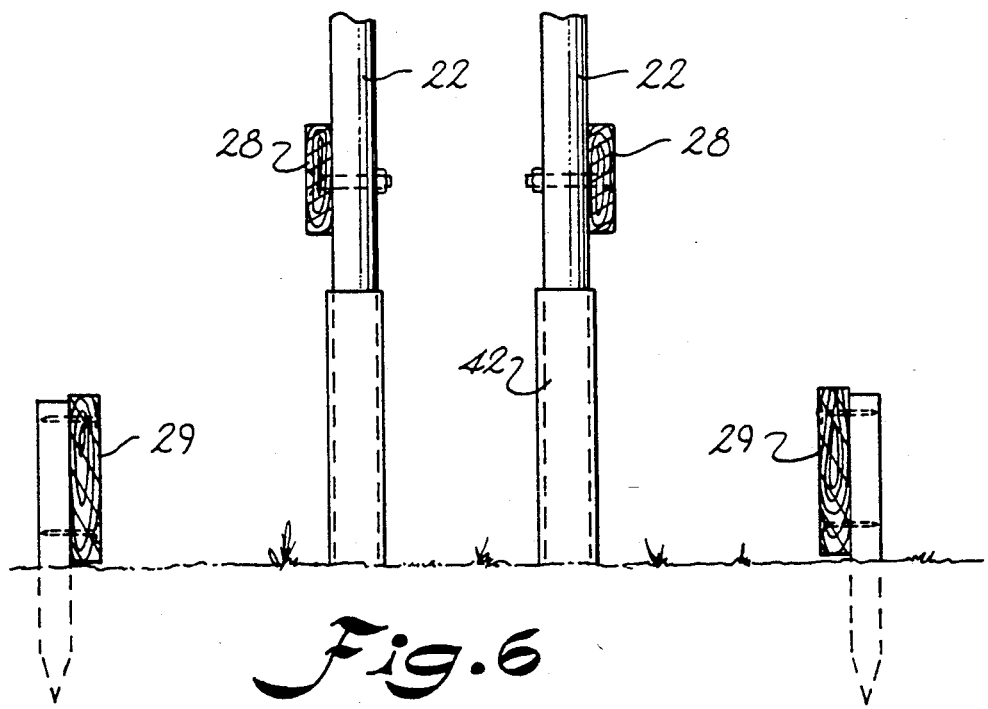
FIG. 6 is a frontal perspective view of a row of paired vertical support poles within their respective tubular sockets. The figure depicts the first pair of support poles of the row and also illustrates the support guide rail attached to the vertical support poles.
Figure 9:
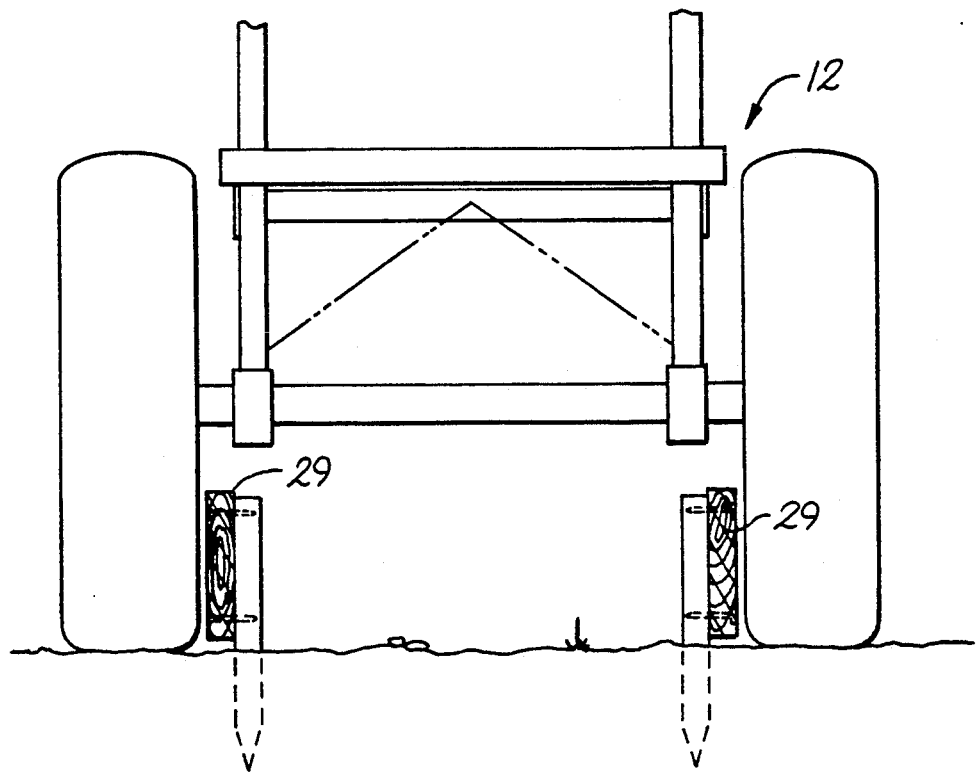
FIG. 9 is a partial perspective view of one embodiment of the guide support rails according to the invention.

In an alternative preferred embodiment as shown in FIGS. 1, 6, and 9, guiding, and aligning means C may comprise guide support rails 29 disposed longitudinally within storage bays 16 along the ground or floor thereof. In this embodiment, rails 29 may be spaced apart a distance less than that between the wheels of elevating trailer 12 and work vehicle 62. In this manner, rails 29 guiding and aligning tracks internal to the wheel base of trailer 12 and vehicle 62, as illustrated in FIG. 9. Preferably, rails 29 are curved or angled at the mouth of storage bay 16, as shown in FIG. 1, to initially position vehicle 62 and trailer 12. In an alternative embodiment, rails 29 may be spaced apart a distance greater than that between the wheels of trailer 12 and vehicle 62, thereby providing guiding tracks external to the respective wheel bases.

Alternatively, guiding and aligning means C may include guide rails 28 positioned along support poles 22 as well as rails 29 along the ground of storage bays 16, as shown in the outermost bays 16 of FIG. 1.

Referring to FIG. 7, work vehicle 62 has elevating trailer 12 hitched thereto. Although not depicted in the figure, elevating trailer 12 would have a plurality of tobacco laden tobacco rods suspended from rails generally along the length of trailer 12. To transfer tobacco rods 10 to holding means A of assembly 100, elevating trailer 12 would be elevated in height, as depicted by the phantom lines in FIG. 7. Work vehicle 62 would then pull (or push) trailer 12 into storage bay 16. Elevating trailer 12 would be positioned within storage bay 16 so that when trailer 12 is lowered, tobacco rods 10 would be transferred to holding means A as the height of trailer 12 passes below that of holding means A. Guide support rail 28 not only provides structural support to frame structure 14 but further serves to align and guide work vehicle 62 and elevating trailer 12 within storage bay 16. In this respect, guide support rail 28 should comprise a material sufficient to withstand occasional impacts from work vehicle 62. For example, a straight wooden rail or board could be used as guide support rail 28.

Figure 2:
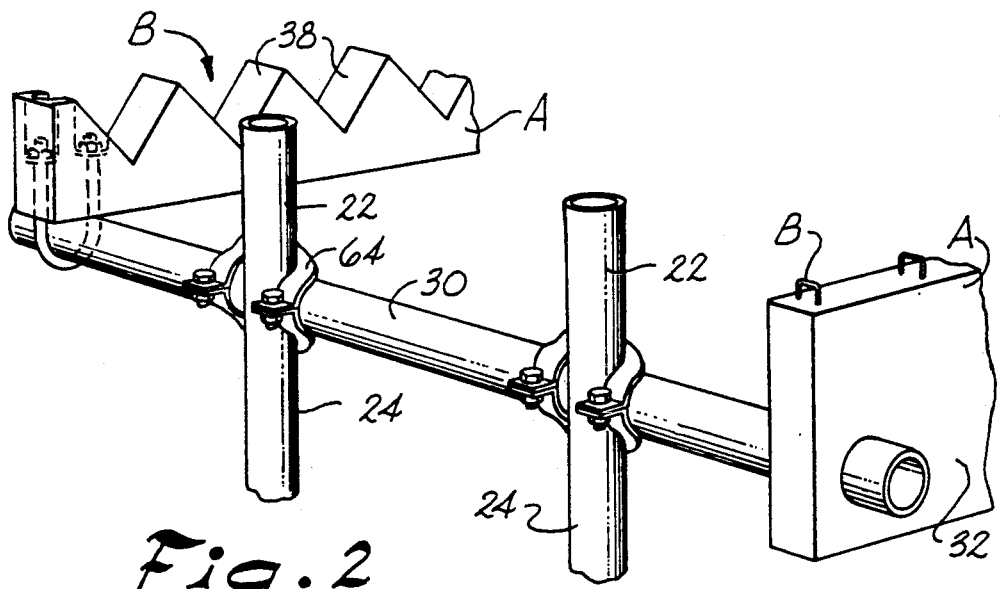
FIG. 2 is a partial perspective view of a portion of the frame structure according to the present invention particularly illustrating a horizontal brace disposed across two vertical support poles.

Frame structure 14 according to the invention may also include a plurality of horizontal braces 30. Braces 30 are mounted or secured to vertical support poles 22 generally near the top thereof. Any appropriate fastening means may be used to secure brace 30 to support pole 22. A simple pipe brace 64, as shown in FIG. 2, is preferred in that it provides a relatively easy and expeditious means for securing horizontal brace 30 to support poles 22. Being that assembly 100 is portable and intended to be assembled and disassembled in the field, it is important that the component parts be adapted or configured for relative ease of assembly without requiring exact and precise alignment of parts. For example, horizontal brace 30 could be secured to support pole 22 by means of a conventional bolt extending through pre-drilled holes in brace 30 and pole 22. However, although this arrangement is within the scope of the present invention, horizontal brace 30 would have to be precisely aligned and positioned relative to support pole 22 so as to align the pre-drilled holes thereby allowing the bolt to pass therethrough. A more versatile and flexible fastening means, such as pipe fastener 64, is preferred in that it allows horizontal brace 30 to be secured to pole 22 at a generally desired point thereon without requiring exact alignment and positioning. A degree of flexibility and leeway in assembly of the component parts of curing cell assembly 100 is desired.

In the embodiment depicted in FIG. 2, horizontal brace 30 is transverse to and extends across pair 24 of vertical support poles 22. In this embodiment, the end portions of horizontal brace 30 would extend respectively into separate adjacent storage bays 16. In the embodiment of the invention where row 20 comprises a single file of vertical support poles, horizontal brace 30 would be similarly attached to a singular support pole 22 via fastening means 64 with the opposite ends thereof extending into adjacent storage bays 16.

Referring to FIGS. 1 and 2, holding means A according to the invention may comprise at least two longitudinally disposed rigid elongated carrying members 32. Carrying members 32 are secured to horizontal braces 30 generally at the ends thereof. Members 32 may rest on braces 30 and be secured appropriately through, for example, the U-bolt assembly, as shown in the left most portion of FIG. 2. Alternatively, carrying member 32 may have pre-drilled holes therethrough through which the end of horizontal brace 30 may be extended, as shown in the right most portion of FIG. 2. Carrying members 32 may comprise any suitable material such as steel, wood, hard plastic material, or the like. A wooden carrying member 32 may be preferred for its ease of manufacture and assembly. Carrying member 32 may also have any number of shapes and is not limited to the rectangular or board shape depicted in FIG. 2. For example, carrying member 32 may comprise a pipe or flat member. Carry members 32 are disposed lengthwise and oppositely faced along storage bay 16 so that each storage bay has a pair of oppositely faced members 32 from which tobacco laden tobacco rods 10 can be suspended.

Examples of the maintaining means B according to the invention are illustrated in FIGS. 1 and 2. Maintaining means B serve to secure the ends of tobacco rods 10 in position along carrying member 32. In this regard, maintaining means B may comprise alternating recesses 38 in which tobacco rods 10 may sit or rest, or spaced apart protuberances 40 which define spaces along member 32 for particular tobacco rods 10 to reside. Protuberances 40 may, for example, comprise simple staples inserted into wooden member 32 at pre-measured intervals.

In an alternative embodiment, carrying member 32 may comprise a relatively flat top surface, as shown in the left most bay 16 of FIG. 1. In this embodiment, carrying member 32 should have a relatively rough top surface whereby the frictional interface between tobacco rod 10 and the top surface is sufficient to maintain the tobacco rod in place. It is important to maintain tobacco rods 10 generally parallel to each other and at preselected positions along carrying member 32 so that elevating trailer 12 may be used to subsequently transfer tobacco rods 10 from storage bay 16 once the tobacco is properly cured.

Once the tobacco is cured and ready for transferring out of assembly 100, elevating trailer 12 would be backed into storage bay 16 and positioned so that its rails are between and under carrying members 32. Elevating trailer 12 would then be elevated and as its rails elevate above the height of carrying members 32 they would lift tobacco rods 10 from the carrying members. In this regard, the rails of the elevating trailer 12 would comprise complimenting intervals or recesses matching those of carrying members 32.

Figure 5:
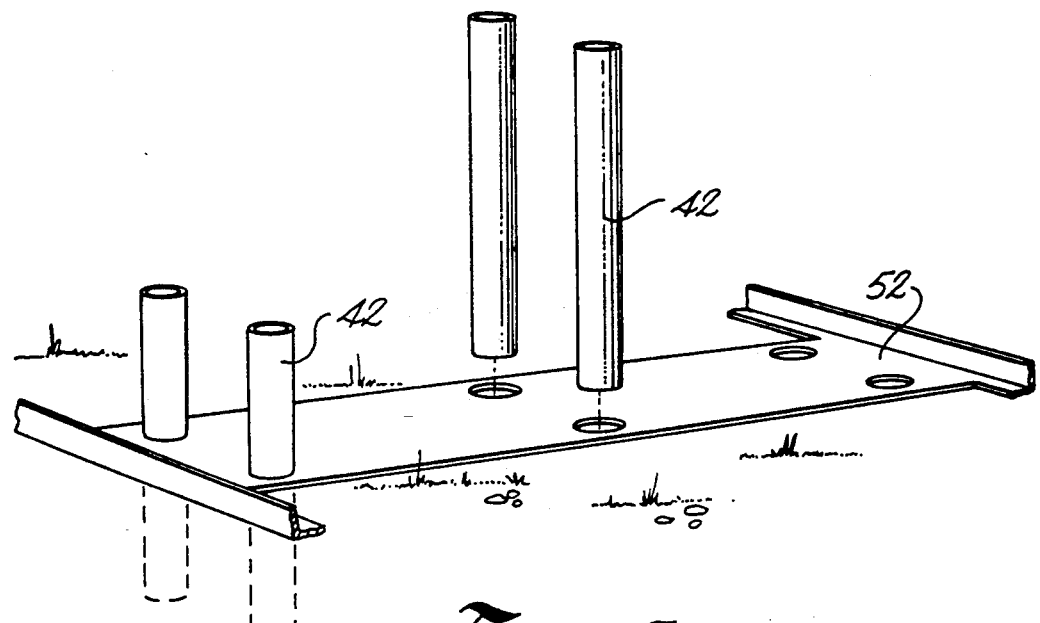
FIG. 5 is a perspective illustration of the tubular supports of the present invention fitting through the tubular openings of the template according to the invention.

Curing cell assembly 100 according to the invention may further comprise tubular sockets 42. As shown in FIGS. 1, 5, and 6, sockets 42 are generally hollow and cylindrical and configured to be driven into the ground in a predetermined pattern which defines rows 20 of vertical support poles 22. In this regard, sockets 42 may comprise a pointed end for being driven into the ground. Poles 22 are then fitted into tubular sockets 42 to form rows 20. A tubular socket 42 is preferably provided for each support pole 22 for ease of assembly and alignment of rows 20. However, it is not a limitation that all of poles 20 be fitted into a socket 42. For example, any combination of support poles 22 could be driven directly into the ground themselves. Tubular sockets 42, however, provide a simple and expedient means in which to insure that support poles 22 are correctly aligned in an upright attitude and adequately supported. Although not shown in the figures, a bolt or similar securing means could be used to secure support poles 22 with sockets 42. However, for ease of assembly a preferred embodiment is to have a friction or slide fit between support poles 22 and sockets 42.

Figure 8:
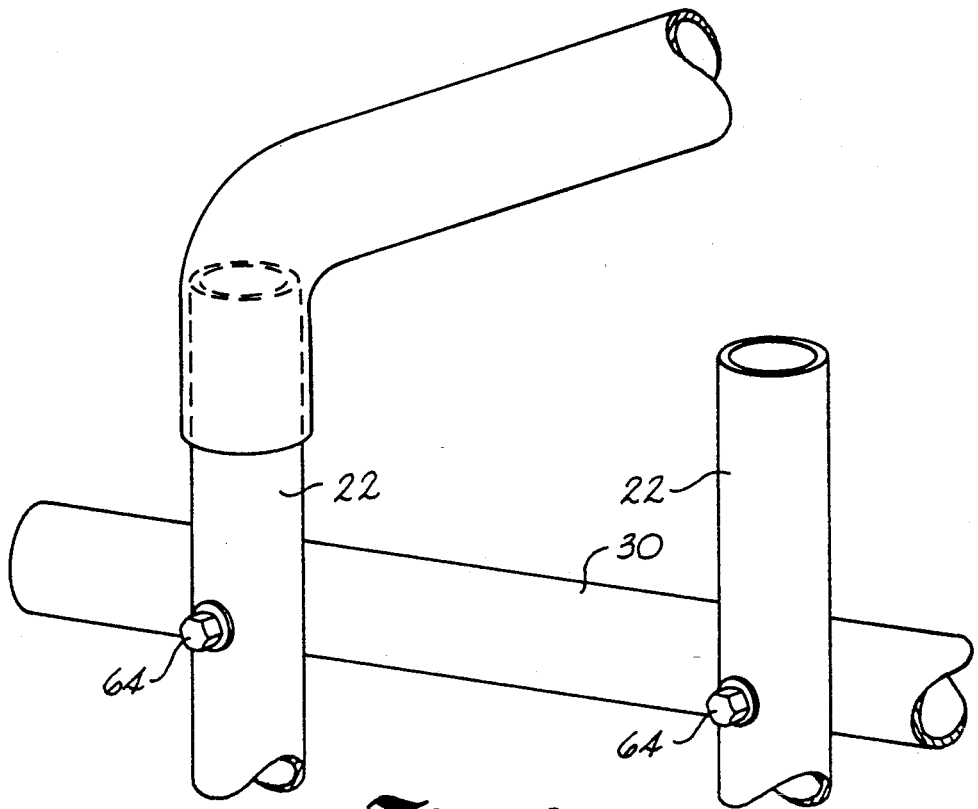
FIG. 8 is a partial perspective view of an embodiment of the roofing braces according to the invention supported by the frame structure, particularly the outermost vertical support tube of the frame structure.

Roof 18 according to the invention preferably comprises a plurality of roofing braces 44 secured to frame structure 14 so as to extend above and across storage bays 16, as shown in FIGS. 1 and 8. Roofing braces 44 preferably comprise rigid lightweight structural elements, such as aluminum piping or PVC piping. Braces 44 are supported by frame structure 14, for example in the embodiment depicted in FIG. 8 where braces 44 have generally hollow ends which slide upon or fit over the top of support poles 22. This is a preferred embodiment in that it provides a simple mechanical means for aligning and supporting roof 18. FIG. 1 depicts an alternative embodiment for supporting roof 18. Braces 44 are secured to and supported by a longitudinal roof brace 45 supported on frame structure 14, for instance across or secured to horizontal braces 30 in a manner similar to that of carrying members 32. Roof 18 also includes covering 46 fitted over roofing braces 44. Covering 46 preferably comprise a lightweight flexible material, such as poly sheeting which can be easily fitted to braces 44. A poly sheeting material is preferred for weight considerations and for ease of assembly and storage purposes. Alternatively, covering 46 may comprise a relative rigid roofing material, such as tin sheeting, plywood, or the like. It should be understood that any conventional roofing structure and appropriate covering may comprise roof 18 according to the invention. It is important that roof 18 extend above carrying members 32 a sufficient height to allow elevating trailer 12 to be driven through storage bay 16 in its elevated posture.

In further accordance with the invention, tobacco curing cell kit 200 is provided having component parts capable of being assembled and disassembled in the field for forming a portable tobacco curing cell, such as curing cell assembly 100 already described. Kit 200 is illustrated in FIG. 1 as being assembled in the field at a preselected site. In essence, kit 200 comprises the component parts of curing cell assembly 100 described above. Hence, the description of assembly 100 is incorporated herein with reference to kit 200.

Kit 200 comprises a combination of a frame structure 14 adapted to be assembled in the field, including a plurality of interchangeable vertical support poles 22, a plurality of interchangeable tubular sockets 42, a plurality of interchangeable horizontal braces 30, and a plurality of interchangeable fasteners 64. The component parts of frame structure 14 are interchangeable in that any one particular part may be utilized wherever that part is called for. For example, kit 200 may include 100 support poles 22. Any one support pole 22 could be used anywhere in the portable tobacco curing cell where a support pole 22 is needed. The support poles 22 need not be individually numbered or specifically patterned in any way. Likewise, any horizontal brace 30 could fit across any support pole 22. This is a relatively important consideration for it provides great flexibility and versatility in construction of kit 200. Furthermore, the interchangeability of parts and relative ease of assembly of kit 200 requires that a far less skilled laborer is needed to construct kit 200.

As described above, tubular sockets 42 are adapted to be driven into the ground in a predetermined pattern of spaced apart longitudinally disposed rows 20 whereby vertical support poles 22 may be fitted into tubular sockets 42 to form spaced apart rows 20 of vertical support poles 22 and whereby horizontal braces 30 may be mounted generally perpendicularly to vertical support poles 22 generally near the top thereof with fasteners 64, whereby when assembled frame structure 14 defines at least one longitudinally disposed storage bay 16 between at least two rows 20 of vertical support poles 22.

Kit 200 further includes rigid elongated tobacco rod carrying members 32 adapted to be secured to horizontal braces 30 and disposed oppositely faced lengthwise relative storage bay 16. Members 32 may comprise tobacco rod maintaining means disposed across the top thereof.

Kit 200 further includes roof 18 adapted to be secured to frame structure 14. Roof 18 preferably comprises a plurality of interchangeable roofing braces 44 adapted to be secured to the outermost of vertical support poles 22 whereby braces 44 extend above and over storage bays 16. Roof 18 further includes covering 46 adapted to be fitted upon or to roofing braces 44.

Figure 3:
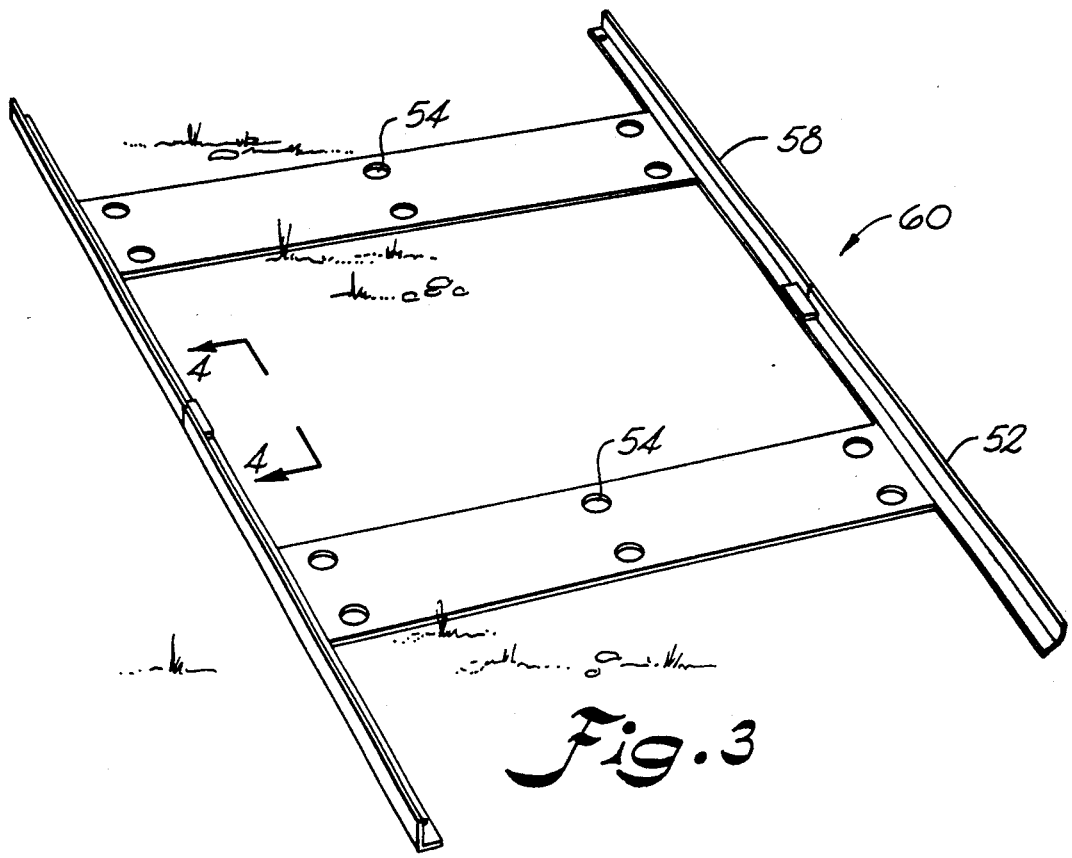
FIG. 3 is a perspective view of the template assembly according to the invention and illustrates two templates being connected together.
Figure 4:
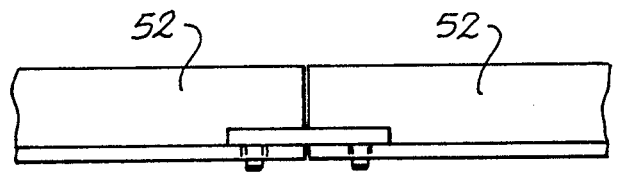
FIG. 4 is a partial perspective view of the connected templates shown in FIG. 3 taken along the lines indicated in FIG. 3.

Preferably, kit 200 includes template 52 having tubular openings 54 defined in a predetermined pattern therein. As shown in FIGS. 3–5, template 52 with openings 54 is designed so that tubular sockets 42 can be driven through openings 54. By defining openings 54 in template 52 in the predetermined pattern, a full proof system is provided for insuring correct positioning and alignment of sockets 42 and support poles 22. It is a relatively simple procedure for workers to lay template 52 upon the ground and then to drive sockets 42 therethrough. Preferably, an additional template 52 is provided being connectable with the other template 52 to form template assembly 60. This arrangement provides a simple method for driving the tubular supports for at least two rows 20, whereby at least one storage bay 16 can be exactly spaced or defined between the rows. Templates 52 can be connected in any conventional manner, including the dowel type fastener illustrated in FIG. 4.

Although FIGS. 3 and 5 depict tubular openings 54 being arranged in pairs 24 corresponding to pairs 24 of vertical support poles 22 illustrated in FIG. 1, it should be understood that openings 54 can be defined in any desired pattern corresponding to the desired arrangement or pattern of vertical support poles 22 intended to form columns 20.

Curing cell kit 200 further includes at least one guide support rail 28 adapted to be either secured transversely to vertical support poles 22 of at least one of rows 20 generally near the bottom of poles 22 and facing inward toward storage bay 16, as previously discussed, or positioned longitudinally on the ground or floor within storage bay 16, also previously discussed.

The method for erecting a portable tobacco curing cell 100 according to the invention comprises the steps of laying a template assembly 60 upon the ground at a preselected site, template assembly 60 having a predetermined pattern of tubular openings 42 disposed therein. The method further includes the step of driving tubular sockets 42 through tubular openings 54 so as to form longitudinally disposed spaced apart rows 20 of tubular sockets 42.

The method further includes lifting template assembly 60 from tubular sockets 42 and repositioning assembly 60 so that additional tubular sockets can be driven therethrough and be aligned with the other tubular sockets 42 so as to lengthen spaced apart rows 20 of tubular sockets 42. This step preferably comprises repositioning template assembly 60 over at least two previously driven tubular sockets 42.

The method further includes fitting vertical support poles 22 into sockets 42 and securing horizontal braces 30 generally perpendicularly to support poles 22 generally near the top thereof. Rigid tobacco rod carrying member 32 is then longitudinally secured to horizontal braces 30 with the fastening means 64, carrying member 32 having tobacco rod maintaining means B disposed along the top thereof.

The present method includes securing roofing braces 44 to the outermost rows of vertical support poles 22 in such a manner that roofing braces extend above and across all of the rows of vertical support poles 22 and finally fitting a covering 46 over roofing braces 44 to complete roof 18 for the curing cell.

The method also includes providing guiding and aligning means within the cell for positively guiding the tobacco laden elevating trailer through the cell, as discussed.

The structural components identified in the discussion of the method of the present invention have been previously described in detail and that description is hereby incorporated in the discussion of the method.

It will be apparent to those skilled in the art that various modifications and variations can be made in the apparatus and method of the present invention without departing from the scope of spirit of the invention. For example, any combination of vertical support poles 22 may be arranged in rows 20 of frame structure 14 according to the invention. Thus, it is intended that the present invention cover the modification and variations of this invention provided they come within the scope of the appended claims and their equivalents.

What is claimed is:

1. A portable curing cell assembly for storing tobacco for curing, the tobacco having been cut and impaled on tobacco rods for transferring to the curing cell assembly, said curing cell assembly comprising:
   a frame structure, said frame structure including a plurality of longitudinally disposed adjacent storage bays defined by spaced apart vertical supports, said storage bays having a width sufficient for allowing a trailer carrying said tobacco rods to be transported therethrough;
   tobacco rod holding members disposed longitudinally along each side of said storage bays at a first height so that tobacco rods suspended from said tobacco rod holding members across said bays, are at a height so that the suspended tobacco stalks are clear of the ground;
   a roof disposed across and above said storage bays, said roof being supported by said frame structure at a predetermined height above said tobacco rod holding means;
   tobacco rod positioning means disposed along said tobacco rod holding members so that said tobacco rods extending across said storage bays are maintained by said positioning means generally parallel relative each other; and
   vehicle guiding members disposed longitudinally within said storage bays spaced apart from said vertical supports at a second height below said first height of said tobacco rod holding members, said guiding members disposed for contacting and guiding a vehicle through said storage bays.

2. The curing cell assembly as in claim 1, wherein said vertical supports comprise spaced apart rows of vertical support poles.

3. The curing cell assembly as in claim 2, wherein said vertical support poles are arranged in transverse pairs in said spaced apart rows.

4. The curing cell assembly as in claim 2, wherein said vehicle guiding members comprise at least one guide support rail secured to said frame structure and longitudinally disposed relative said storage bays at said second height so as to contact the wheels of a work vehicle used for transporting said tobacco through said storage bays whereby said guide support rail maintains proper alignment of said work vehicle within said storage bays.

5. The curing cell assembly as in claim 2, wherein said frame structure further includes a plurality of horizontal braces secured across said vertical support poles generally near the top thereof disposed generally transversely relative said storage bays.

6. The curing cell assembly as in claim 5, wherein said tobacco rod holding members comprise at least two longitudinally disposed rigid elongated rails secured to said horizontal brace, said rails being disposed oppositely faced generally along the length of said storage bays.

7. The curing cell assembly as in claim 2, further comprising a plurality of tubular sockets, said tubular sockets configured to be driven into the ground in a predetermined pattern, said pattern defining said rows of vertical support poles whereby said vertical support poles are fitted into said tubular sockets to form said rows of vertical support poles.

8. The curing cell assembly as in claim 1, wherein said tobacco rod positioning means comprise alternating recesses disposed along the length of said tobacco rod holding members, said recesses disposed at pre-measured intervals.

9. The curing cell assembly as in claim 1, wherein said tobacco rod positioning means comprise protuberances disposed at pre-measured distances from each other along the top of said tobacco rod holding members.

10. The curing cell assembly as in claim 1, wherein said roof comprises a plurality of roofing braces secured to said frame structure and extending across said storage bays, and a covering fitted over said roofing braces.

11. The curing cell assembly as in claim 1, wherein said vehicle guiding members comprise a pair of guide support rails disposed longitudinally along the ground within said storage bays, said guide support rails spaced apart a distance less than the space between the wheels of a work vehicle used to transport said tobacco rods whereby said guide support rails guide the work vehicle into said storage bays and maintain said work vehicle aligned within said storage bays.

12. The curing cell assembly as in claim 1, wherein said vehicle guiding members comprise a pair of guide support rails disposed longitudinally along the ground within said storage bays, said guide support rails spaced apart a distance greater than the distance between the wheels of a work vehicle used to transport said tobacco rods whereby said guide support rails guide the work vehicle into said storage bays and maintain said work vehicle aligned within said storage bays.

13. A tobacco curing cell kit having component parts capable of being assembled and disassembled in the field for forming a portable tobacco curing cell, said kit comprising the combination of:

a frame structure adapted to be assembled in the field, said frame structure including a plurality of interchangeable vertical support poles, a plurality of interchangeable tubular sockets, a plurality of interchangeable horizontal braces, and a plurality of interchangeable fasteners, said tubular sockets adapted to be driven into the ground in a predetermined pattern of spaced apart longitudinally disposed rows whereby said vertical support poles are fittable into said tubular sockets to form spaced apart rows of said vertical support poles and whereby said horizontal braces are mountable generally perpendicularly to said vertical support poles generally near the top thereof with said fasteners, whereby when assembled said frame structure defines at least one longitudinally disposed storage bay between at least two rows of vertical support poles;

rigid elongated tobacco rod carrying members securable to said horizontal braces so as to be disposed oppositely faced lengthwise relative said storage bay, said tobacco rod carrying members comprising tobacco rod maintaining means disposed across the top thereof;

a roof adapted securable to said frame structure, said roof comprising a plurality of roofing braces securable to the outermost of said vertical support poles whereby said roofing braces extend above and over said storage bays, and said roof includes a covering fittable upon said roofing braces; and elongated guide support rails disposable longitudinally within said storage bay and configured to guide and align a work vehicle through said storage bay.

14. The curing cell kit as in claim 13, further comprising a template, said template comprising tubular openings disposed therein through which said tubular sockets can be driven, said tubular openings disposed in said template in a predetermined pattern so that said tubular sockets can be driven therethrough to form said spaced apart longitudinally disposed rows.

15. The curing cell kit as in claim 14, wherein said tubular openings in said template are disposed in pairs so that said tubular sockets can be driven into the ground through said template in transverse pairs so that each said row comprises pairs of transversely disposed said tubular sockets.

16. The curing cell kit as in claim 15, further comprising at least one additional said template, said templates connectable together and having an exact predetermined space therebetween when connected so that at least two rows of said tubular sockets can be positioned through said tubular openings in said connected templates with an exact space therebetween.

17. The curing cell kit as in claim 13, wherein said guide support rails are securable transversely to said vertical support poles of one of said rows generally near the bottom of said poles facing said storage bay, said guide support rail adapted to be secured to said vertical support poles after said vertical support poles have been fitted into said tubular sockets.

18. The curing cell kit as in claim 13, wherein said guide support rails are positionable longitudinally along the ground with each said storage bay.

19. A portable curing cell assembly for storing tobacco for curing, the tobacco having been cut and impaled on tobacco rods which have been loaded onto a trailer for transferring to the curing cell assembly, said curing cell assembly comprising:

a frame structure, said frame structure defining three storage bays formed by four rows of paired vertical support poles fitted into tubular sockets which have been driven into the ground, said storage bays having a width sufficient for allowing the trailer to be transported therethrough, said frame structure including horizontal braces secured transversely across said pairs of vertical support poles generally at the top thereof;

oppositely faced rigid elongated carrying members secured to said horizontal braces along the length of said storage bays, said elongated carrying members disposed longitudinally along each side of said storage bays so that tobacco laden tobacco rods can be suspended from said elongated carrying members across said bays, said elongated carrying members being supported by said frame structure at a predetermined height thereon so that the suspended tobacco stalks have a predetermined degree of ground clearance;

a roof disposed across and above said storage bays, said roof comprising a plurality of roofing braces extending across said storage bays and secured to the outermost vertical support poles of said frame structure, said roof supported by said frame structure at a predetermined height above said elongated carrying members and comprising a flexible poly sheet material fitting over said roofing braces;

means for maintaining tobacco rods in place along said elongated carrying members so that said tobacco rods extending across said storage bay are generally parallel relative each other, said maintaining means comprising spaced apart protuberances extending from the top of said rigid elongated carrying members along the length thereof; and means for positively aligning and guiding the trailer through said storage bays.

* * * * *